US012726514B1

(12) United States Patent
Gilda et al.

(10) Patent No.: US 12,726,514 B1
(45) Date of Patent: Sep. 1, 2026

(54) METHOD AND SYSTEM FOR DETECTING FINANCE-RELATED PHISHING ATTACKS

(71) Applicant: Deep Ocean Security LTD., Tel Aviv (IL)

(72) Inventors: Alon Gilda, Haifa (IL); Noam Danino, Ramat Gan (IL); Oran Moyal, Tel Aviv (IL)

(73) Assignee: Deep Ocean Security LTD., Tel Aviv (IL)

( * ) Notice: Subject to any disclaimer, the term of this patent is extended or adjusted under 35 U.S.C. 154(b) by 0 days.

(21) Appl. No.: 19/347,031

(22) Filed: Oct. 1, 2025

(51) Int. Cl.
*H04L 9/40* (2022.01)
*G06Q 40/02* (2023.01)

(52) U.S. Cl.
CPC ....... *H04L 63/1483* (2013.01); *G06Q 40/024* (2025.08)

(58) Field of Classification Search
CPC ............ H04L 63/1441; H04L 63/1483; G06Q 40/024
See application file for complete search history.

(56) References Cited

U.S. PATENT DOCUMENTS 12,160,447 B2 * 12/2024 Mutairi ............... H04L 63/1441
12,413,545 B1 * 9/2025 Nguyen ................ H04L 51/224
2007/0033639 A1 * 2/2007 Goodman ........... H04L 63/1416 726/2
2012/0296692 A1 * 11/2012 O'Malley .......... G06Q 10/0635 705/7.28
2014/0199664 A1 * 7/2014 Sadeh-Koniecpol ........................ G06F 21/564 434/118
2020/0028876 A1 * 1/2020 Cohen ................. H04L 63/1425
2021/0264430 A1 * 8/2021 Searl ...................... G06N 20/00
2022/0210188 A1 * 6/2022 Grewal ............... H04L 63/1483
2024/0257157 A1 * 8/2024 Katt ................... G06Q 30/0185
2024/0356948 A1 * 10/2024 Seyeditabari ....... H04L 63/1416
2024/0356969 A1 * 10/2024 Brabec ................ G06Q 10/107
(Continued)

OTHER PUBLICATIONS

Jean-Baptiste Alexandre Moreau Dupont, An Apache-Centric Explainable AI Framework for Real-Time Cloud Cybersecurity: Multimodal Threat Intelligence and Integrated Credit-Fraud Risk Modeling Using Multivariate Classification, IJRPETM (Year: 2023).*
(Continued)

*Primary Examiner* — Shanto Abedin
(74) *Attorney, Agent, or Firm* — M&B IP Analysts, LLC

(57) ABSTRACT

A method and system for defending against finance-related phishing attacks is presented. The method includes detecting when a message is a finance-related message based on contents of the message, wherein a finance-related message is a message that references at least identifiable financial elements; for each finance-related message, identifying a type of finance-related malicious activity, wherein a type of finance-related malicious activity is based on characteristics of the finance-related message; performing, using at least one AI agent from a network of AI agents, in-depth analysis of the contents of the message, wherein the at least one AI agent is specialized to detect the finance-related malicious activity of the identified type; and when a finance-related malicious activity is detected in the message as a result of performing the in-depth analysis, causing execution of a mitigation action.

21 Claims, 8 Drawing Sheets

(56) References Cited

U.S. PATENT DOCUMENTS

| | | | | |
|---|---|---|---|---|
| 2025/0077681 | A1* | 3/2025 | Sen | G06F 21/577 |
| 2025/0080579 | A1* | 3/2025 | Mushtaq | H04L 63/1483 |
| 2025/0310374 | A1* | 10/2025 | Meharunnisa | H04L 63/1483 |
| 2026/0012465 | A1* | 1/2026 | Jakobsson | H04L 63/0853 726/25 |

OTHER PUBLICATIONS

Layla Keating, Multi-Modal AI Systems for Fraud Detection Across Banking Channels, ResearchGate (Year: 2023).*

* cited by examiner

Fig. 6A
Email Header
610
FROM: "youBank" support@youbank -security.com
TO: Daniel.Jones@email.com
DATE: August 1, 2025
SUBJECT: ACTION REQUIRED: Suspicious Login Detected – Verify Immediately
Account_Validation_Notice.pdf
70 KB
Attachment
620
Email Body
630
Dear Valued Customer,
We've detected a suspicious login attempt to your youBank Online Account from an unrecognized device in Frankfurt, Germany .
For your security, we have temporarily locked your account until you confirm this activity.
To verify your identity and restore access, please scan the secure QR code in the attached document using your mobile device.
Failure to verify within 24 hours will result in a permanent suspension of your online access.
Thank you for your prompt attention.
youBank Online Security Team
www.youbank.com
Toll-Free: 1-800-YOU-BANK
Email: support@youbank.com
YOUBANK

600A

600B

Contents 640

Account Suspended Due to Unrecognized Login

Device : Samsung Galaxy S21

Location : Frankfurt, Germany

IP Address : 87.65.23.101

Time : 3:42AM (UTC+1)

To verify your account and unlock access:

Scan the QR code below using your phone camera

QR Code 650

Once scanned, you will be redirected to our secure verification portal youBank® -- Trusted. Secure. Always.

METHOD AND SYSTEM FOR DETECTING FINANCE-RELATED PHISHING ATTACKS

TECHNICAL FIELD

This disclosure generally relates to cybersecurity and, more particularly, to the mechanisms for detecting malicious textual communications in the form of finance-related phishing attacks.

BACKGROUND

Phishing attacks via email and messaging services are deceptive attempts by threat actors to trick recipients into revealing sensitive information or performing actions that benefit the attacker. These messages often impersonate trusted individuals or organizations, using convincing language and visual cues to appear legitimate. They typically contain malicious links, attachments, or requests for personal or financial data. Messaging platforms beyond email, including SMS and collaboration tools, have also become common channels for such attacks, broadening the attack surface and increasing the chances of success.

Artificial intelligence (AI) is significantly increasing both the volume and complexity of email phishing attacks. Automated systems powered by AI can generate convincing, personalized messages at scale, eliminating the need for human attackers to manually craft each email. AI tools can analyze vast amounts of data, such as social media activity or organizational structures, to tailor phishing attempts that appear more authentic and relevant to the recipient. Moreover, advanced natural language processing enables these emails to mimic human tone, grammar, and even cultural nuances, making them harder to detect. As a result, phishing campaigns are not only more frequent but also more sophisticated, overwhelming traditional security measures and increasing the risk of successful attacks.

Finance-related phishing attacks, especially those generated with AI, are particularly damaging, as they often target accounts payable teams, finance executives, or procurement departments. These attacks may impersonate vendors requesting payment detail changes, or simulate urgent invoices that appear to come from legitimate businesses. In some cases, attackers insert themselves into ongoing financial conversations or pose as executives requesting wire transfers. These messages are designed to appear routine and credible, exploiting the familiarity of financial workflows and the urgency commonly associated with payment processing.

Identifying malicious emails becomes especially difficult when dealing with new vendors, or existing vendors whose communications suddenly appear different (for example, due to a new domain, branding changes, or unfamiliar contacts). Malicious actors exploit this uncertainty, crafting emails that mimic legitimate variations, making them indistinguishable without deeper inspection. The overlap between benign operational changes and common phishing tactics adds to the challenge of making accurate judgments quickly. Additionally, traditional systems fail to detect when financial fraud comes from compromised vendor accounts that a company regularly does business with, exploiting long-standing trust, communication history, and established behavioral baselines between organizations. Because current systems are not designed to detect threats embedded within trusted relationships, such attacks often bypass traditional security layers without triggering any alerts. When a vendor account is compromised, attackers inherit that trust and are able to launch fraudulent requests that appear entirely legitimate, making them nearly indistinguishable from genuine business communication.

Given the volume of messages organizations receive daily, especially those involving finance, the ability to evaluate emails in real-time is critical. Messages that are clearly safe must be processed without delay to avoid disrupting business operations. At the same time, those containing subtle indicators of potential financial fraud must be identified and handled with scrutiny. This balance is difficult to maintain, as attackers continually adapt their methods to bypass traditional detection, and even minor missteps can lead to costly breaches or fraudulent transactions.

Therefore, it would be advantageous to provide a solution that would cure the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include detecting when a message is a finance-related message based on contents of the message, where a finance-related message is a message that references at least identifiable financial elements. The method may also include for each finance-related message, identifying a type of finance-related malicious activity, where a type of finance-related malicious activity is based on characteristics of the finance-related message. The method may furthermore include performing, using at least one AI agent from a network of AI agents, in-depth analysis of the contents of the message, where the at least one AI agent is specialized to detect the finance-related malicious activity of the identified type. The method may in addition include when a finance-related malicious activity is detected in the message as a result of performing the in-depth analysis, causing execution of a mitigation action. Other embodiments of this aspect include corresponding computer systems, apparatus, and computer programs recorded on one or more computer storage devices, each configured to perform the actions of the methods.

Implementations may include one or more of the following features. The method may include: when a finance-related malicious activity is not detected as a result of performing the in-depth analysis, releasing the message to an intended recipient client device. The method may include: receiving a stream of messages from a plurality of message servers; and performing a learning process based on contents of messages in the stream of messages. The method where performing the learning process based on the contents of the messages in the stream of messages, further may include: using at least one classifier model, classifying the messages in stream of messages from at least one tenant organization as finance-related based on the contents of the messages; extracting the contents of the messages classified as finance-related, where the contents include at least named entities and other relevant information; and indexing the extracted contents of the messages, where the indexed contents include contextual information on patterns in the contents of the messages for the at least one tenant organization; cross-referencing the indexed contents to identify at least frequency, correlation, and may include of the patterns in the contents of the messages for the at least one tenant organization; and aggregating the cross-referenced contents into a baseline representing at least legitimate communication and financial indicators unique to the tenant organization. The method where performing, using the at least one AI agent from the network of AI agents, in-depth analysis of the contents of the message, further may include: extracting, by the at least one AI agent, the contents of the message; and comparing, by the at least one AI agent, the extracted contents of the message to corresponding indexed contents, where the corresponding indexed contents include contextual information on patterns in contents of messages for at least one tenant organization. The method where a finance-related malicious activity is detected when the extracted contents of the message deviate from the corresponding indexed contents. The method where extracting, by the at least one AI agent, the contents of the message, further may include: utilizing at least one multi-modal generative artificial intelligence (genAI) model to extract the contents of the message. The method where performing, using the at least one AI agent from the network of AI agents, in-depth analysis of the contents of the message, further may include: assigning a finance-related attack detection task to each AI agent of the at least one AI agent, where each assigned specialized task relates to detecting a type of finance-related malicious activity; configuring each AI agent with tools to achieve the assigned finance-related attack detection task, where tools are external services that the AI agent can invoke to accomplish the assigned specialized task; and provisioning a finance-related attack detection reasoning logic in each AI agent, where the finance-related attack detection reasoning logic relates to each assigned finance-related attack detection task and invocation of the tools to accomplish the finance-related attack detection task. The method where the at least one AI agent includes a multi-modal generative artificial intelligence (genAI) model. The method where the network of AI agents includes a plurality of AI agents, each AI agent of the plurality of AI agents configured to communicate and coordinate with other AI agents in the network of AI agents. The method where detecting when the message is a finance-related message based on the contents of the messages further may include: using at least one classifier model, classifying the message as finance-related based on the contents of the message. Implementations of the described techniques may include hardware, a method or process, or a computer tangible medium.

In one general aspect, a non-transitory computer-readable medium may include one or more instructions that, when executed by one or more processing circuitry of a device, cause the device to: detect when a message is a finance-related message based on contents of the message, where a finance-related message is a message that references at least identifiable financial elements; for each finance-related message, identify a type of finance-related malicious activity, where a type of finance-related malicious activity is based on characteristics of the finance-related message; perform, using at least one AI agent from a network of AI agents, in-depth analysis of the contents of the message, where the at least one AI agent is specialized to detect the finance-related malicious activity of the identified type; and when a finance-related malicious activity is detected in the message as a result of perform the in-depth analysis, causing execution of a mitigation action. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: detect when a message is a finance-related message based on contents of the message, where a finance-related message is a message that references at least identifiable financial elements. The system may in addition for each finance-related message, identify a type of finance-related malicious activity, where a type of finance-related malicious activity is based on characteristics of the finance-related message. The system may moreover perform, using at least one AI agent from a network of AI agents, in-depth analysis of the contents of the message, where the at least one AI agent is specialized to detect the finance-related malicious activity of the identified type. The system may also when a finance-related malicious activity is detected in the message as a result of perform the in-depth analysis, causing execution of a mitigation action. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: when a finance-related malicious activity is not detected as a result of perform the in-depth analysis, releasing the message to an intended recipient client device. The system where the memory contains further instructions which when executed by the processing circuitry further configure the system to: receive a stream of messages from a plurality of message servers; and perform a learning process based on contents of messages in the stream of messages. The system where the memory contains further instructions that, when executed by the processing circuitry for performing the learning process based on the contents of the messages in the stream of messages, further configure the system to: use at least one classifier model, classifying the messages in stream of messages from at least one tenant organization as finance-related based on the contents of the messages; extract the contents of the messages classified as finance-related, where the contents include at least named entities and other relevant information; and index the extracted contents of the messages, where the indexed contents include contextual information on patterns in the contents of the messages for the at least one tenant organization; cross-reference the indexed contents to identify at least frequency, correlation, and may include of the patterns in the contents of the messages for the at least one tenant organization; and aggregate the cross-referenced contents into a baseline representing at least legitimate communication and financial indicators unique to the tenant organization. The system where the memory contains further instructions that, when executed by the processing circuitry for performing, using the at least one AI agent from the network of AI agents, in-depth analysis of the contents of the message, further configure the system to: extract, by the at least one AI agent, the contents of the message; and compare, by the at least one AI agent, the extracted contents of the message to corresponding indexed contents, where the corresponding indexed contents include contextual information on patterns in contents of messages for at least one tenant organization. The system where a finance-related malicious activity is detected when the extracted contents of the message deviate from the corresponding indexed contents. The system where the memory contains further instructions that, when executed by the processing circuitry for extracting, by the at least one AI agent, the contents of the message, further configure the system to: utilize at least one multi-modal generative artificial intelligence (genAI) model to extract the contents of the message. The system where the memory contains further instructions that, when executed by the processing circuitry for performing, using the at least one AI agent from the network of AI agents, in-depth analysis of the contents of the message, further configure the system to: assign a finance-related attack detection task to each AI agent of the at least one AI agent, where each assigned specialized task relates to detecting a type of finance-related malicious activity; configure each AI agent with tools to achieve the assigned finance-related attack detection task, where tools are external services that the AI agent can invoke to accomplish the assigned specialized task; and provision a finance-related attack detection reasoning logic in each AI agent, where the finance-related attack detection reasoning logic relates to each assigned finance-related attack detection task and invocation of the tools to accomplish the finance-related attack detection task. The system where the at least one AI agent includes a multi-modal generative artificial intelligence (genAI) model. The system where the network of AI agents includes a plurality of AI agents, each AI agent of the plurality of AI agents configured to communicate and coordinate with other AI agents in the network of AI agents. The system where the memory contains further instructions that, when executed by the processing circuitry for detecting when the message is a finance-related message based on the contents of the messages, further configure the system to: use at least one classifier model, classifying the message as finance-related based on the contents of the message. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
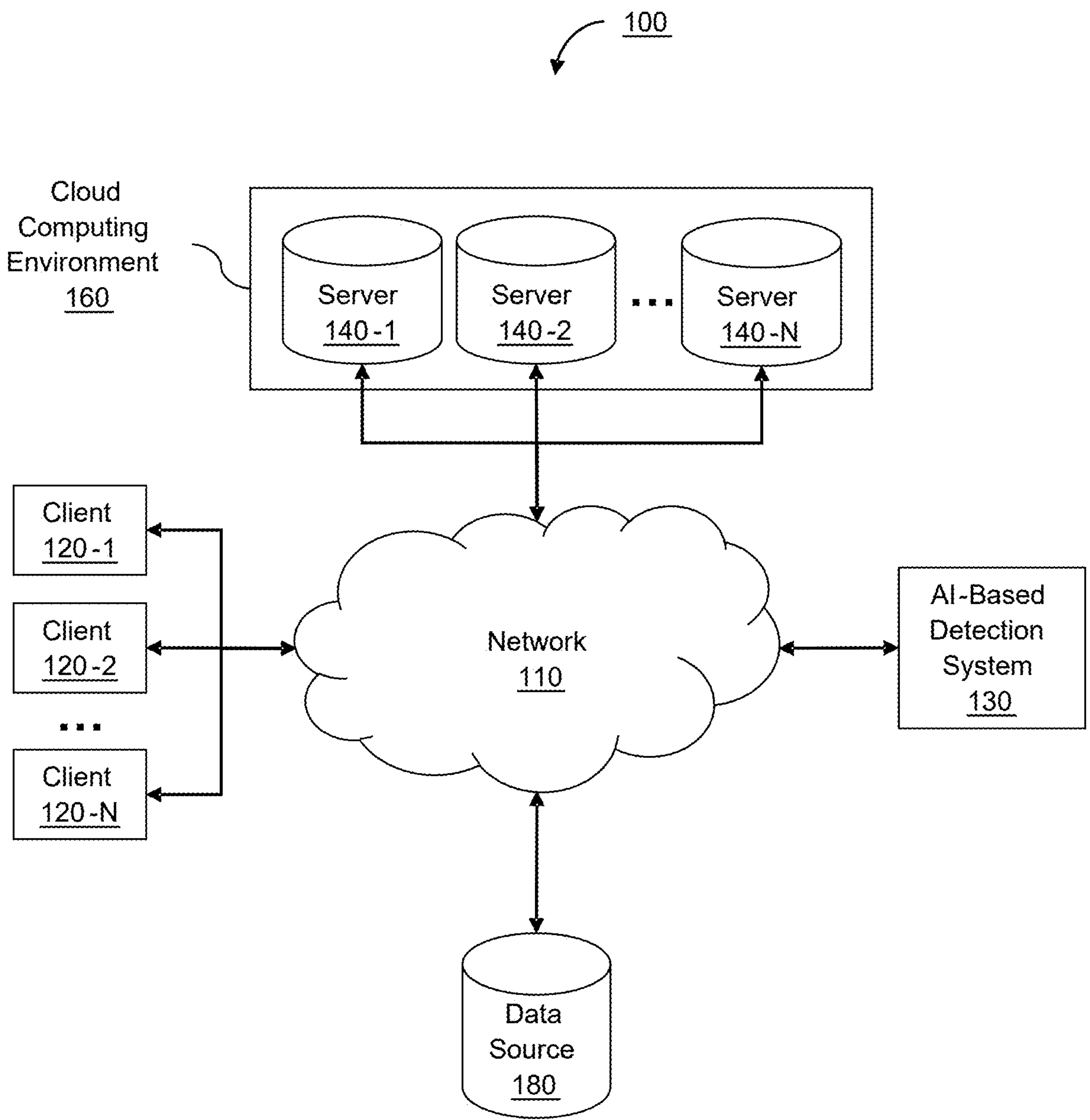
FIG. 1 shows an example network diagram utilized to describe the various disclosed embodiments.

It is important to note that the embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments present a method and system for detecting finance-related phishing attacks and similar attacks where threat actors compromise trusted vendor accounts and use messages to trick individuals into revealing sensitive information or performing harmful actions. The method and system employ a multi-tiered pipeline, which involves an extraction phase in which data from unstructured organizational traffic is used to build detailed baselines of financial indicators and trusted communication patterns specific to the organization, an initial classification phase to identify messages that are finance-related, and an in-depth analysis phase, using a network of AI agents, to detect whether the finance-related messages indicate malicious activity.

The disclosed method and system use large language model (LLM)-based extraction of high-quality data points from unstructured organizational traffic, such as invoice attachments and documents, to build detailed baselines of financial indicators and trusted communication patterns specific to the organization. The disclosed method and system learn and model elements such as typical message signatures, linguistic style, communication structure, geolocation metadata, and document content to accurately represent legitimate transactional behavior within the organization. The disclosed method and system then apply AI agents capable of processing massive volumes of incoming finance-related messages, analyzing the extracted financial indicators in real time against the previously established baselines. The disclosed method and system identify anomalous or suspicious activity that deviates from normal financial behavior or communication style, even when such messages originate from previously trusted sources.

The disclosed embodiments enable accurate detection of malicious financial activity embedded in otherwise legitimate-looking traffic, including messages from compromised vendors, improving detection fidelity while minimizing compute usage, ensuring that legitimate messages are not unnecessarily delayed or flagged.

Additionally, the method and system allow for a fast response using an initial classification module on the contents of messages, and a slower, in-depth analysis using AI agents for the detection of complex finance-related attacks and the like that are flagged from earlier analysis. This multi-stage approach results in improved computer efficiency, faster computer processing, and reduced computer resource usage while enabling increased accuracy in the detection of various types of phishing attacks.

Additionally, the method and system allow for processing large volumes of messages in real-time with high accuracy, overcoming the limitations of traditional methods that cannot scale effectively under such demands. The method and system use LLM-based extraction to extract named entities and other relevant information from messages specific to each tenant organization, establishing baselines of legitimate communication based on contextual details unique to the tenant organization. This tenant-specific extraction and establishment of baselines enables more precise determination of whether a message is malicious by aligning the extracted content with organizational patterns. The method and system then leverage a trained LLM to analyze new messages by comparing the contents of messages to the established baselines, allowing for accurate differentiation between phishing attempts and legitimate communication. This serves to enhance scalability, accuracy, and efficiency for organizations managing high message traffic.

Further, the method and system allow for achieving accurate analysis while reducing compute requirements. Instead of relying solely on resource-intensive AI agents to analyze every message, the system uses a classifier as a first step to filter and route only a subset of finance-related messages (defined below) for deeper reasoning based on precise baselines established through LLM-based extraction. This means that AI agents, which demand significant computational power, are invoked sparingly and only where necessary to identify potential threats. By combining lightweight classification with selective AI reasoning, the system minimizes overall compute usage while maintaining high detection accuracy, ensuring efficiency without compromising security.

The disclosed embodiments are operable for any agent architecture and toolchain and should not be limited to any one architecture and toolchain discussed hereinbelow. One such architecture, according to an embodiment, is the Model Context Protocol (MCP). Additionally, the disclosed embodiments are operable with any language model and is not limited to specific instruction formats for autonomous agents.

FIG. 1 shows an example network diagram 100 utilized to describe the various disclosed embodiments.

The network diagram 100 illustrated in FIG. 1 includes client device 120-1 through 120-N, where N is an integer greater than 1 (hereinafter, client 120 in the singular or clients 120 in the plural); server 140-1 through 140-N, where N is an integer greater than 1 (hereinafter, server 140 in the singular or servers 140 in the plural); data source 180, and AI-based detection system 130 all connected to network 110.

Client 120 may be a personal computer, a mobile phone, a smartphone, a tablet computer, a wearable device, or any compute device, and the like. Client 120 typically includes a processor and a memory that can be configured to execute script codes, software, HTTP/S pages, and the like. Client 120 may be operated by a legitimate user or a legitimate program.

Clients 120 are configured to communicate through a structured exchange of data. Clients 120 initiate requests to servers 140 that manage and deliver services. In the context of messaging, each client 120 employs a messaging client application to compose and send messages. Such messaging client application may include a desktop application (e.g., Microsoft® Outlook®, Slack®), or a web application (e.g., Gmail®), and the like. These messages are transmitted over network 110 using standard internet protocols, such as HTTP, HTTP/s, MAPI, IMAP, POP3, SMTP, and ActiveSync, and the like.

The contents of the messages are routed to/for servers 140, which are hosted in cloud computing environment 160. These servers 140 manage storage, delivery, and access to message content, enabling scalability, reliability, and global availability. Upon arrival at the server 140, the message is stored until the intended recipient client 120 accesses the message through a messaging client application on the intended recipient client 120. The server 140 authenticates the user, retrieves the relevant message data, and transmits the contents back to the client 120. Examples for a server 140 may include, for example, a Microsoft® Exchange Server®, Postfix®, Google Workspace, and the like.

As mentioned, servers 140 are deployed in cloud computing platform 160. Servers 140 deployed in the cloud computing platform 160 communicate with clients 120, AI-based detection system 130. In some embodiments, cloud computing environment 160 may be deployed in various configurations including, but not limited to, public, private, hybrid, or edge-based configurations. Examples of a cloud computing environment 160 include Amazon Web Services®, Microsoft Azure®, Google Cloud Platform™, IBM Cloud®, Oracle Cloud®, and the like.

AI-based detection system 130 is configured to receive a stream of messages from a message server (including, but not limited to, servers 140). AI-based detection system 130 is configured to perform a learning process based on the contents of messages in the stream of messages. In some embodiments, AI-based detection system 130 is configured to perform the learning process by using a classifier model to classify messages from a tenant organization as finance-related or not finance-related based on the contents of the messages, extracting the contents of the messages classified as finance-related, and indexing the extracted contents of the messages, wherein the indexed contents include contextual information on patterns in the contents of the messages for the tenant organization.

A finance-related message is defined as a message (whether communicated internally or externally of an organization) that references identifiable financial elements; transactions; payment instructions; banking credentials; financial system access; artifacts such as, but not limited to, invoices, account numbers, authentication elements (e.g., digital signatures from financial institutions); a combination thereof; and the like. Such a finance-related message is typically directed toward initiation, authorization, process, inquiry, a combination thereof, and the like about financial operations. For example, a message requesting immediate wire transfer approval, a message containing an attached vendor invoice with account details, a message with a bank employee's signature and account reconciliation data, a combination thereof, and the like may be classified as finance-related.

AI-based detection system 130 is configured to classify, using the classifier model, as finance-related or not finance-related using machine learning techniques, generative AI, a combination thereof, and the like. AI-based detection system 130 is configured to classify at least the primary content of a message. Primary content is content that includes data that is rendered accessible by default within the communication context. Classification is performed on primary content such as, but not limited to, e-mail subject line, body of text, hyperlink text, interactive element, names of attached files, a combination thereof, and the like. Additionally, AI-based detection system 130 is configured to classify at least the secondary contents of messages. Secondary content refers to data associated with a message that is not immediately accessible without user interaction, such as clicking a link, opening an attachment, expanding a collapsed section, or navigating to another page. Secondary content includes, but is not limited to, the underlying targets of hyperlinks, the contents of attached files, media loaded dynamically, deferred or externally referenced data, a combination thereof, and the like.

In some embodiments, a classifier is trained to classify contents of messages as finance-related or not finance-related based on historical data of an organization. Historical data includes, but is not limited to, messages transmitted (to, from, and between) members of an organization, data on previous cyberattacks, defenses to cyberattacks, malicious data, legitimate data, and the like. Classification is discussed in more detail hereinbelow. The performance of the learning process by AI-based detection system 130 is discussed in more detail hereinbelow.

AI-based detection system 130 is configured to receive new messages. Such messages may be received when the performance of the learning process is completed. In an embodiment, a received new message is classified as finance-related or not finance-related. The classification of messages is performed according to the embodiments discussed above with respect to the classification of messages during the learning process. When a new message is a finance-related message, AI-based detection system 130 is configured to perform in-depth analysis of the contents of the new message, using an AI agent from a network of AI agents.

AI-based detection system 130 is configured to assign a finance-related attack detection task to each AI agent. Each assigned finance-related attack detection task is related to a type of finance-related malicious activity. In some embodiments, for each message determined as finance-related, a type of the finance-related malicious activity associated with the finance-related message is identified. Accordingly, based on the identified type of finance-related malicious activity, a particular specialized AI agent that is configured to perform the in-depth analysis for the identified type of finance-related malicious activity is utilized for in-depth analysis. A type of finance-related malicious activity is based on characteristics of the finance-related message. Characteristics include, but are not limited to, a specific attack vector and intended outcome. A specific attack vector includes, but is not limited to, phishing messages with spoofed financial domains, phishing messages with malicious attachments, phishing messages with embedded links, a combination thereof, and the like. An intended outcome includes, but is not limited to, deceiving recipients into revealing sensitive financial credentials, initiating unauthorized transactions, executing malware that provides persistent access to financial systems, a combination thereof, and the like. Each assigned finance-related attack detection task may include determining whether at least the contents of a message are indicative of a specific type of phishing attack such as, but not limited to, financial fraud, financial phishing, and the like. AI-based detection system 130 is further configured to configure each AI agent with tools to achieve the assigned finance-related attack detection task. Tools are external services that the AI agent can invoke to accomplish the assigned task. Tools may include an external data source (e.g., data source 180), indexed contents (performed as part of the learning process discussed above), a combination thereof, and the like. AI-based detection system 130 is further configured to provision a finance-related attack detection reasoning logic in each AI agent. The finance-related attack detection reasoning logic relates to each assigned finance-related attack detection task and invocation of the tools to accomplish the task. In some embodiments, for each message determined as finance-related at S340, a type of the finance-related malicious activity associated with the finance-related message is identified. As explained above, the type of finance-related malicious activity is based on characteristics of the finance-related message. Accordingly, based on the identified type of finance-related malicious activity, an AI agent that is configured to perform the in-depth analysis for the identified type of finance-related malicious activity is utilized for the in-depth analysis.

Additionally, the AI agent of the AI-based detection system 130 is configured to extract the contents of the new message and compare the extracted contents to corresponding indexed contents (e.g., via a call to a tool). The indexed contents include contextual information on patterns in the contents of the messages for the tenant organization. and the extracted contents are compared to the corresponding indexed contents to detect a deviation that amounts to a finance-related malicious activity. For example, finance-related malicious activity is detected when the extracted contents of the new message deviate sufficiently from the corresponding indexed contents. In some embodiments, a deviation of the extracted contents from the corresponding indexed contents is sufficient when the extracted contents exceed a predetermined threshold.

In an embodiment, AI-based detection system 130 is configured to cause execution of a mitigation action when a finance-related malicious activity is detected. Such mitigation action may include, but is not limited to, blocking the message the new message. When the new message is found to be legitimate finance-related activity, AI-based detection system 130 is configured to release the message to the client application on the intended recipient client device 120. In some embodiments, the messaging client application may flag the message. This in-depth analysis using the AI agent is discussed in more detail hereinbelow.

AI-based detection system 130 is configured to receive data from data source 180 as part of the performance of classification and in-depth analysis by a specialized agent. Data source 180 is a service that provides structured, actionable information about digital threats, vulnerabilities, malicious activity, a combination thereof, and the like. Data source 180 provides enrichment for security tools and analysts to more accurately detect, assess, and respond to risks in real time. For example, data source 180 may include data such as, but not limited to, known bad IPs, domain reputations, malware signatures, contextual details about threat actors, a combination thereof, and the like. Examples of data source 180 include, but are not limited to, IP and domain reputation feeds, malware hash databases, phishing URL blacklists, vulnerability databases, and threat actor profiles from commercial threat intelligence platforms.

It should be noted that the AI-based detection system 130 can be realized as a physical machine, or a virtual entity executed of a hardware layer. A virtual entity may include a virtual machine, a software container, a microservice, and the like.

An AI agent is a software system that perceives its environment, makes decisions, and takes actions autonomously to achieve specific goals using artificial intelligence techniques such as machine learning, reasoning, or natural language processing. AI agent may be realized in software. As used herein, the term "software" refers to one or more sequences of instructions, logic, or routines, including but not limited to source code, object code, intermediate code, interpretable code, or executable code, that may be stored on a non-transitory computer-readable medium and executed by one or more processors. The software may be implemented using one or more machine learning frameworks, including but not limited to TensorFlow™, PyTorch™, ONNX™, or equivalent platforms. The software may be executed in virtualized environments, such as containers or serverless architectures, or may be deployed via cloud infrastructure. The term "hardware" refers to one or more physical computing devices or components capable of performing operations, including model training, inference, and/or data processing. Non-limiting examples of hardware include: Central Processing Units (CPUs); Graphics Processing Units (GPUs); Tensor Processing Units (TPUs);

Application-Specific Integrated Circuits (ASICs); Field Programmable Gate Arrays (FPGAs); Neural Processing Units (NPUs) or equivalent dedicated AI accelerators; On-device microcontrollers or edge processors capable of running trained models, and the like. The described embodiments are not limited to any particular implementation platform and may be deployed across heterogeneous environments comprising combinations of the above.

It should be noted that although one AI-based detection system 130 is illustrated in FIG. 1 for the sake of simplicity, the embodiments disclosed herein can be applied to a plurality of AI-based detection systems 130. Additionally, clients 120 may be in different geographical locations.

Figure 2:
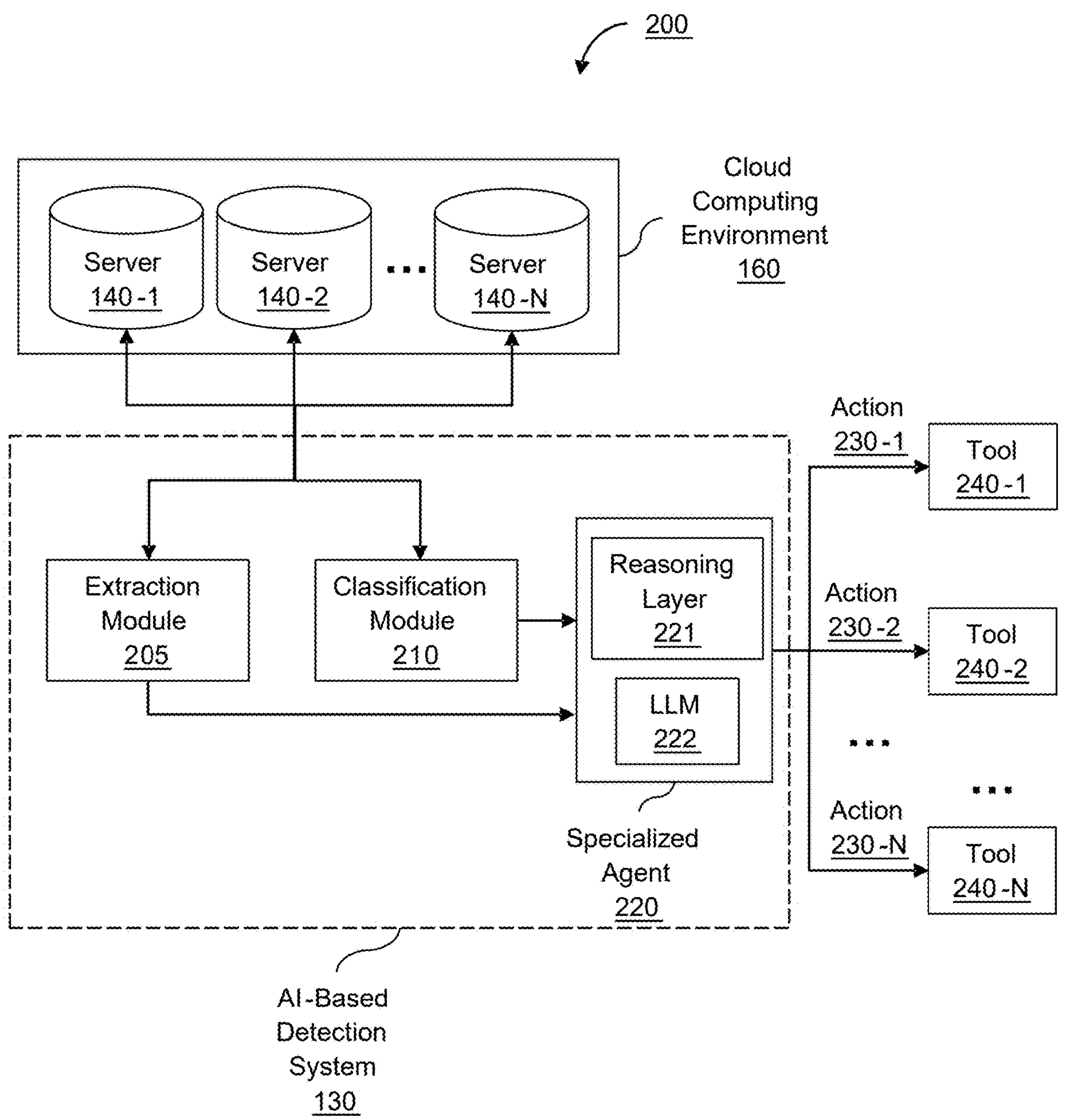
FIG. 2 is a functional diagram illustrating a process for detecting finance-related phishing attacks using a multi-tiered, agentic architecture according to an embodiment.

FIG. 2 is a functional diagram 200 illustrating a process for detecting finance-related phishing attacks using a multi-tiered, agentic architecture according to an embodiment. The process may be performed by the AI-based detection system 130.

In an embodiment, extraction module 205 is configured to receive a stream of messages from servers 140 in cloud computing environment 160 (as discussed above in FIG. 1). Extraction module 205 is configured to extract the contents of messages in the stream of messages during a learning process discussed in more detail herein. Extracting contents of the messages involves extracting high-quality data points from unstructured traffic such as, but not limited to, invoice attachments and other document attachments, as explained in more detail herein. In some embodiments, extracting the contents of the messages is performed by, but not limited to, an LLM, a multi-modal generative artificial intelligence (genAI) model to extract contents (including images, videos, named entities, etc.) of the message, a combination thereof, and the like. Extracting contents of the message includes extracting financial indicators and legitimate communication patterns including, but not limited to, invoice numbers, payment terms, bank account identifiers, and transaction references, along with non-financial but highly relevant attributes including recurring named entities, organizational roles, common communication styles, and metadata such as geolocation stamps or device indicators signatures, styles of communication, and geolocation metadata. In some embodiments, such financial indicators are indexed.

In some embodiments, establishing a baseline of legitimate communication for each tenant organization involves normalizing the extracted data points and cross-referencing across multiple communications to detect frequency, correlation, and recurrence patterns that characterize legitimate traffic in the given tenant organization. The extracted content is then aggregated into a baseline that represents the legitimate communication of the tenant organization, capturing stylistic patterns, semantic structures, and transaction-related signals. In some embodiments, the baseline is refined by continuously integrating new legitimate communications observed during the learning phase. The resulting baseline serves as a statistical and semantic reference unique to the tenant organization, enabling downstream detection of deviations in financial or stylistic features that may indicate vendor account compromise or other fraudulent activity.

In an embodiment, classification module 210 is configured to receive a stream of messages from servers 140 in cloud computing environment 160 (as discussed above in FIG. 1). Classification module 210 includes one or more classifier models (not shown). A classifier model is a machine learning model (e.g., a generative AI model, a language model, and the like) configured to classify the contents of messages as finance-related or not finance-related. In some embodiments, as discussed above with respect to FIG. 1, classifier model is trained, using a variety of machine learning techniques, to classify whether the message is finance-related or not.

In an embodiment, routing messages first to the classification module 210 allows messages that are not finance-related to be filtered out and ones that are classified as finance-related to be sent for in-depth analysis by specialized agent 220, which performs in-depth analysis of the contents of the messages that is slow relative to the speed of analysis by the classification module 210. This routing logic of messages to different modules configured to perform analyses at varying speeds and depth allows the AI-based detection system 130 to improve computer efficiency, reduce computer resource usage, and the like. Results of classification module 210 are configured to be received by specialized agent 220. In some embodiments, for each message classified as finance-related by the classification module 210, a type of the finance-related malicious activity associated with the finance-related message is identified. As explained above, the type of finance-related malicious activity is based on characteristics of the finance-related message. Accordingly, based on the identified type of finance-related malicious activity, a particular specialized agent 220 that is configured to perform the in-depth analysis for the identified type of finance-related malicious activity is utilized for the in-depth analysis.

Additionally, the contents extracted from the extraction module 205 are configured to be received by the specialized agent 220. By using baselines of legitimate communication for each tenant organization based on contents extracted by the extraction module 205 (during a learning phase) and by comparing the baselines to content extracted from new messages, the specialized agent 220 is configured to detect whether a new message deviates from the established baselines, indicating a potential phishing attack or the like. In some embodiments, specialized agent 220 is configured to extract contents of new messages and to analyze (e.g., compare) the contents of the extracted contents to corresponding contents extracted by the extraction module 205. In other embodiments, In some embodiments, extracting the contents of the messages is performed by, but not limited to, an LLM, a multi-modal generative artificial intelligence (genAI) model to extract contents (including images, videos, named entities, etc.) of the message, a combination thereof, and the like. Extraction in a learning phase and comparison of extracted contents during in-depth agentic analysis is discussed in more detail herein.

Specialized agent 220 is configured to perform task-specific analysis of messages. Although not shown for simplicity purposes, specialized agent 220, in some embodiments, is realized as a plurality of specialized agents 220. Each specialized agent 220 is configured to perform a particular task that is related to detecting a finance-related attack via a message. Tasks include determining whether the contents of a message are indicative of a specific type of finance-related phishing attack such as, but not limited to, financial fraud, credential theft, and the like. The result of the in-depth analysis of each specialized agent 220 deployed for a particular analysis is processed by AI-based detection system 130. AI-based detection system 130 is configured to cause execution of a mitigation action when a specialized agent 220 detects that a message is malicious, including, but not limited to, blocking the message. When a message is found to be legitimate, AI-based detection system 130 is configured to release the message to the client application on the intended recipient client device (e.g., client 120, FIG. 1).

Additionally, each specialized agent 220 is configured with a corresponding tool 240-1 through 240-N, where N is an integer greater than 1 (hereinafter, tool 240 in the singular and tools 240 in the plural). Tool 240 refers to the integrated set of external tools, software, and services that the specialized agent 220 can access and use to accomplish complex tasks beyond its built-in capabilities. This tool 240 forms a workflow where the specialized agent 220 dynamically selects and coordinates various tools, including, but not limited to, APIs, databases, computation engines, or web interfaces, to gather information, execute commands, perform reasoning, or interact with external systems. Tools 240 that correspond to each specialized agent 220 include tools that are particular to a specialized task of that specialized agent 220. In some embodiments, tools 240 may be different for each specialized agent 220. In other embodiments, some tools 240 may be the same for some specialized agents 220. Each specialized agent 220 may invoke tools 240 through a variety of mechanism, including, but not limited to, locally executable functions, remote API calls, client-side extensions, Model Context Protocol (MCP), Agent2Agent Protocol (A2A), and the like, where each mechanism enables different modes of interaction and execution.

Reasoning layer 221 of specialized agent 220 is configured to store finance-related attack detection reasoning logic. LLM 222 of specialized agent 220 is configured to execute a prompt to generate a hidden representation (or simply internal state) that encapsulates context, specialized tasks, and possible actions for the specialized agent 220. Based on the internal state generated by the LLM 222, the reasoning layer 221 determines which actions 240-1 through 240-N to take, where N is an integer greater than 1 (hereinafter, action 240 in the singular, or actions 240 or action sequence 240 in the plural). Actions 240 may involve calling tools 240 to take or one or more actions 240.

In some embodiments, actions 240 may include, but is not limited to, generating a response for the AI-based detection system 130 or continuing to reason internally. If invoking a tool 240 is necessary, specialized agent 220 constructs a structured request that includes parameters needed by tool 240. Tool 240 is configured to execute a query and return a result. Once tool 240 returns a result, the result is re-ingested by LLM 222 along with the prior context, allowing specialized agent 220 to update the internal state. LLM 222 is configured to generate the final response, incorporating both initial reasoning from a reasoning layer 221 and the result of the interaction with a tool 240.

In some embodiments, this thought-reasoning-action-response cycle may repeat multiple times if the problem requires iterative reasoning or multiple tools 240. In some embodiments, throughout the loop, memory and state management play a key role, ensuring continuity and coherence. The architecture driving this loop, in some embodiments, includes reasoning layer 221 (including finance-related attack detection reasoning logic) that monitors for tool triggers, manages state across turns, and enforces structured output where needed.

In some embodiments, specialized agents 220 may communicate and coordinate in a network of specialized agents 220. The network of specialized agents 220 may communicate with one another via message passing (e.g., encoded in JSON, function calls, and the like), shared memory, and the like. In some embodiments, specialized agents 220 may be instantiated as a specialized instance of a language model, and each specialized agent 220 may further be configured for distinct roles. In an embodiment, specialized agents 220 may operate synchronously through centralized orchestration. In other embodiments, specialized agents 220 may be decentralized, using, for example, turn-based role delegation, task queues, and the like. Additionally, in some embodiments, specialized agents 220 communicate using the Model Context Protocol (MCP), Agent2Agent Protocol (A2A), and the like.

It should be noted that utilizing a network (e.g., a plurality) of specialized agents 220 as opposed to a single, generic agent ensures that each specialized agent 220 is given a task that is efficiently achievable by each specialized agent 220, thus allowing for accurate results and efficient computer processing.

It should also be noted that the configuration of the modules in FIG. 2 is not limited to the configuration demonstrated. In some embodiments, the configuration of the modules of the AI-based detection system 130 varies per tenant organization.

It should be understood that any "module" discussed herein may be implemented in various forms. Specifically, a module can be implemented in hardware, software, firmware, or any combination thereof, unless explicitly stated otherwise. The exact form of implementation may depend on design constraints, performance considerations, and application-specific requirements. The term "hardware" refers to one or more physical computing devices or components capable of performing operations, including model training, inference, and/or data processing. Non-limiting examples of hardware include are provided above. The described embodiments are not limited to any particular implementation platform and may be deployed across heterogeneous environments comprising combinations of the above.

Figure 3:
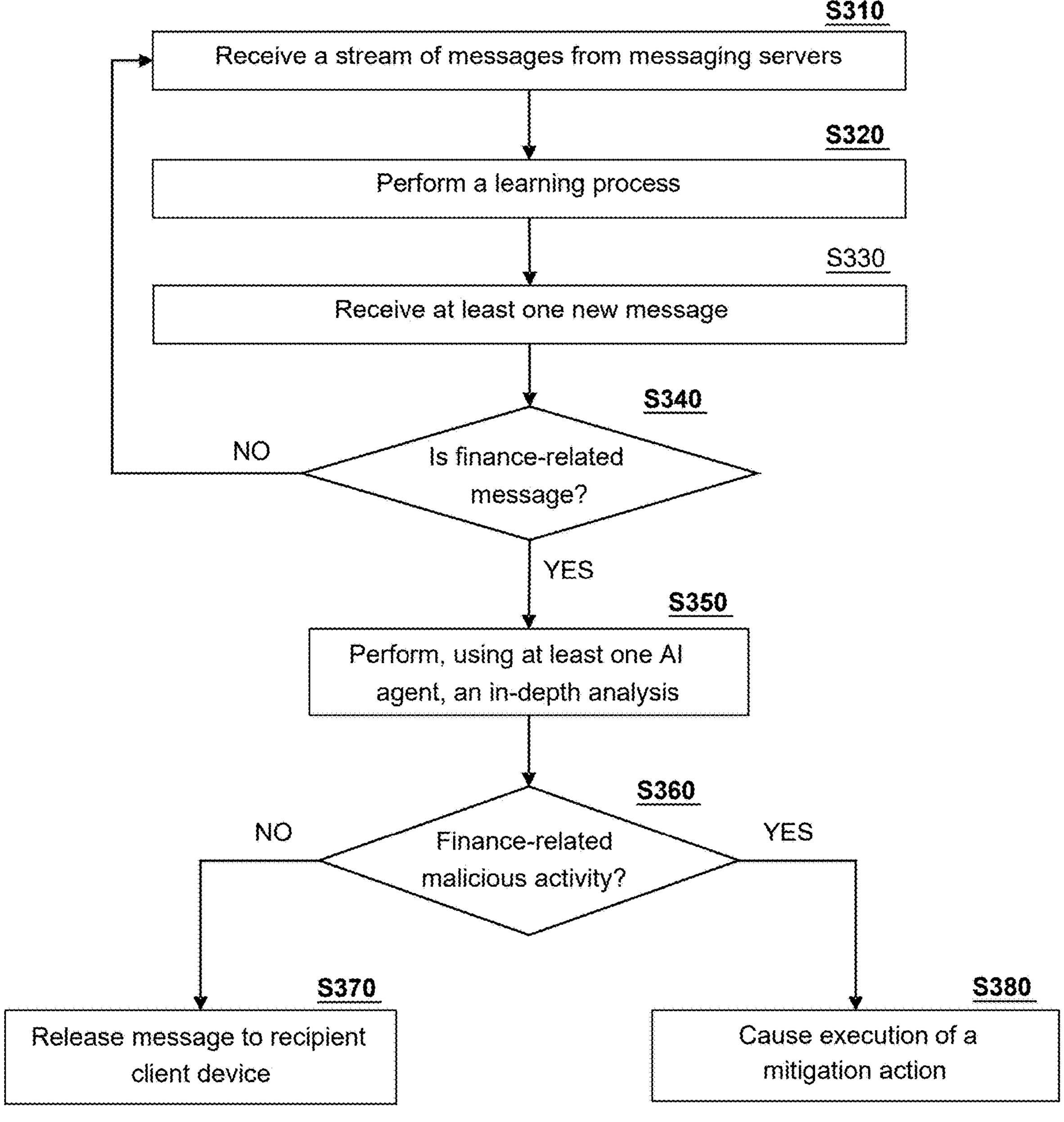
FIG. 3 is a flowchart of an example process for detecting finance-related phishing attacks using an adaptive, multi-tiered analysis according to an embodiment.

FIG. 3 is a flowchart of an example process 300 for detecting finance-related phishing attacks using an adaptive, multi-tiered analysis according to an embodiment. In some embodiments, process 300 is performed by AI-based detection system 130.

At S310, a stream of messages is received from one or more message servers. Message servers include, but are not limited to, servers in a cloud computing environment or platform (e.g., servers 140 in cloud computing environment 160, FIG. 1). Message servers are configured to store messages such as emails, SMS, and the like (examples of which are discussed above).

In some embodiments, receiving a stream of messages includes grouping messages into categories which may serve as labeled channels for communication. This segmentation of messages into categories allows certain types of messages of the stream of messages to be received and routed for processing (e.g., analysis, investigation, and the like) by specialized modules that are configured to process the particular type of message, thus reducing unnecessary processing and improving computer efficiency.

At S320, a learning process is performed. In some embodiments, the learning process is performed based on contents of messages in the stream of messages. In some embodiments, during the performance of the learning process, it is assumed (e.g., verified and the like) that there are no phishing attacks or any other malicious intent of the messages.

In some embodiments, performing the learning process includes classifying messages from a tenant organization as finance-related or not finance-related based on the contents of the messages. In some embodiments, the learning process is performed using a classifier model. The classifier model is configured (e.g., trained) to classify contents of the messages as explained above based on the contents of the messages.

In some embodiments, the classifier model is a machine learning model (e.g., a supervised machine learning, unsupervised machine learning, semi-supervised machine learning, and the like). The machine learning model is configured (e.g., trained using a variety of machine learning techniques) to classify whether the message is finance-related or not finance-related. In some embodiments, the classifier model is configured to use NLP to parse the intent of the sender of each message (e.g., finance-related intent and the like). In some embodiments, a gradient boosting algorithm is used for classification of contents of messages. In another embodiment, the classifier model is realized using, e.g., a generative AI model, a language model, and the like to classify the messages. Such an operation may be achieved using zero-shot or few-shot classification.

In some embodiments, performing the learning process includes extracting the contents of the messages classified as finance-related. In some embodiments, extracting the contents of the new message classified as finance-related, further includes utilizing a multi-modal generative artificial intelligence (genAI) model to extract primary contents and secondary contents of the new message. As explained above, primary contents are data that is rendered accessible by default in the new message classified as finance-related. As explained above, secondary contents are data that is associated with the new message that is not readily accessible without user interaction.

In some embodiments, extracting contents of messages includes extracting various types of content (explained in more detail herein) such as, but not limited to, financial indicators and legitimate communication patterns. Legitimate communication patterns and financial indicators include, but are not limited to, message signatures, styles of communication, and geolocation metadata. Extracting various types of content serves to establish a baseline of legitimate communication in messages in the tenant organization. Establishing such a precise baseline allows the detection of cyberattacks where a threat actor uses a compromised vendor account to send a legitimate-seeming message.

In some embodiments, establishing a baseline of legitimate communication for each tenant organization involves normalizing the extracted data points and cross-referencing across multiple communications to detect frequency, correlation, and recurrence patterns that characterize legitimate traffic in the given tenant organization. The extracted content is then aggregated into a baseline that represents the legitimate communication of the tenant organization, capturing stylistic patterns, semantic structures, and transaction-related signals. In some embodiments, the baseline is refined by continuously integrating new legitimate communications observed during the learning phase. The resulting baseline serves as a statistical and semantic reference unique to the tenant organization, enabling downstream detection of deviations in financial or stylistic features that may indicate vendor account compromise or other fraudulent activity.

In some embodiments, performing the learning process includes indexing the extracted contents of the messages. Indexing the extracted contents serves to organize the extracted contents to provide contextual information for the tenant organization. This contextual information includes patterns in the contents of the messages specific to the tenant organization. In some embodiments, the indexed contents are stored in a data store for retrieval as part of other processes disclosed in more detail herein. The performance of the learning process is discussed in more detail with respect to FIG. 6.

In an embodiment, execution proceeds with S330 when the learning has concluded. This may occur when sufficient numbers of messages have been received and processed for training the classification, after predefined time interval, and or both.

At S330, a new message is received. In some embodiments, the new message is received from one or more message servers. Message servers are discussed in more detail herein.

At S340, it is determined whether the new message is a finance-related message. A finance-related message, as defined above, is a message (whether communicated internally or externally of an organization) that references identifiable financial elements; transactions; payment instructions; banking credentials; financial system access; artifacts such as, but not limited to, invoices, account numbers, authentication elements (e.g., digital signatures from financial institutions); a combination thereof; and the like.

In some embodiments, determining whether the new message is a finance-related message includes classifying a new message from a tenant organization as finance-related or not finance-related based on the contents of the new message and contextual information about the tenant organization from which the new message is received. A new message is defined as a message that is received (e.g., received during the performance of the detection process) after the learning process at S320 is performed. In some embodiments, the same or similar classifier model used in the learning process at S320 is used in the determination of whether the new message is finance-related.

At S350, an in-depth analysis, using an AI agent, is performed. In some embodiments, performing the in-depth analysis includes extracting the contents of the new message that is classified as finance-related (e.g., by the classifier model). In some embodiments, extracting the contents of the new message further includes utilizing a multi-modal generative artificial intelligence (genAI) model to extract primary contents and secondary contents of the new message.

In some embodiments, performing the in-depth analysis process includes comparing the extracted contents of the new message to corresponding contents that are indexed and stored during the performance of the learning process at S420. The performance of the in-depth analysis is discussed in more detail with respect to FIG. 5.

In some embodiments, for each message determined as finance-related at S340, a type of the finance-related malicious activity associated with the finance-related message is identified. As explained above, the type of finance-related malicious activity is based on characteristics of the finance-related message. Accordingly, based on the identified type of finance-related malicious activity, an AI agent that is configured to perform the in-depth analysis for the identified type of finance-related malicious activity is utilized for the in-depth analysis.

At S360, it is determined whether a finance-related malicious activity is detected. If NO, execution proceeds with S350. If YES, execution proceeds with S360.

In some embodiments, determining whether finance-related malicious activity is detected is based on the comparison of the extracted contents to the corresponding indexed contents. Finance-related malicious activity is detected when there is a sufficient deviation. For example, when the extracted contents of the new message deviate sufficiently from the corresponding indexed contents, it may be determined that the new message is indicative of finance-related malicious activity. In some embodiments, a deviation of the extracted contents from the corresponding indexed contents is sufficient when the extracted contents exceed a predetermined threshold.

At S370, the message is released to the intended recipient client device. When a message is found to be legitimate (e.g., spam), the message may be released to the client application (e.g., an email application) on the intended recipient client device. In some embodiments, the client application on the intended recipient client device may flag the message as spam, legitimate, and the like according to the contents of the message according to existing defense mechanisms built into the client application.

At S380, execution of a mitigation action is caused. In some embodiments, when it is detected that a message is malicious, a mitigation action is executed, including, but not limited to, blocking the malicious message. In some embodiments, the malicious message is labeled according to the attack technique. When a message is found to be legitimate, the message may be released to the client application on the intended recipient client device. In some embodiments, the client application on the intended recipient client device may flag the message as spam, legitimate, and the like according to the contents of the message.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
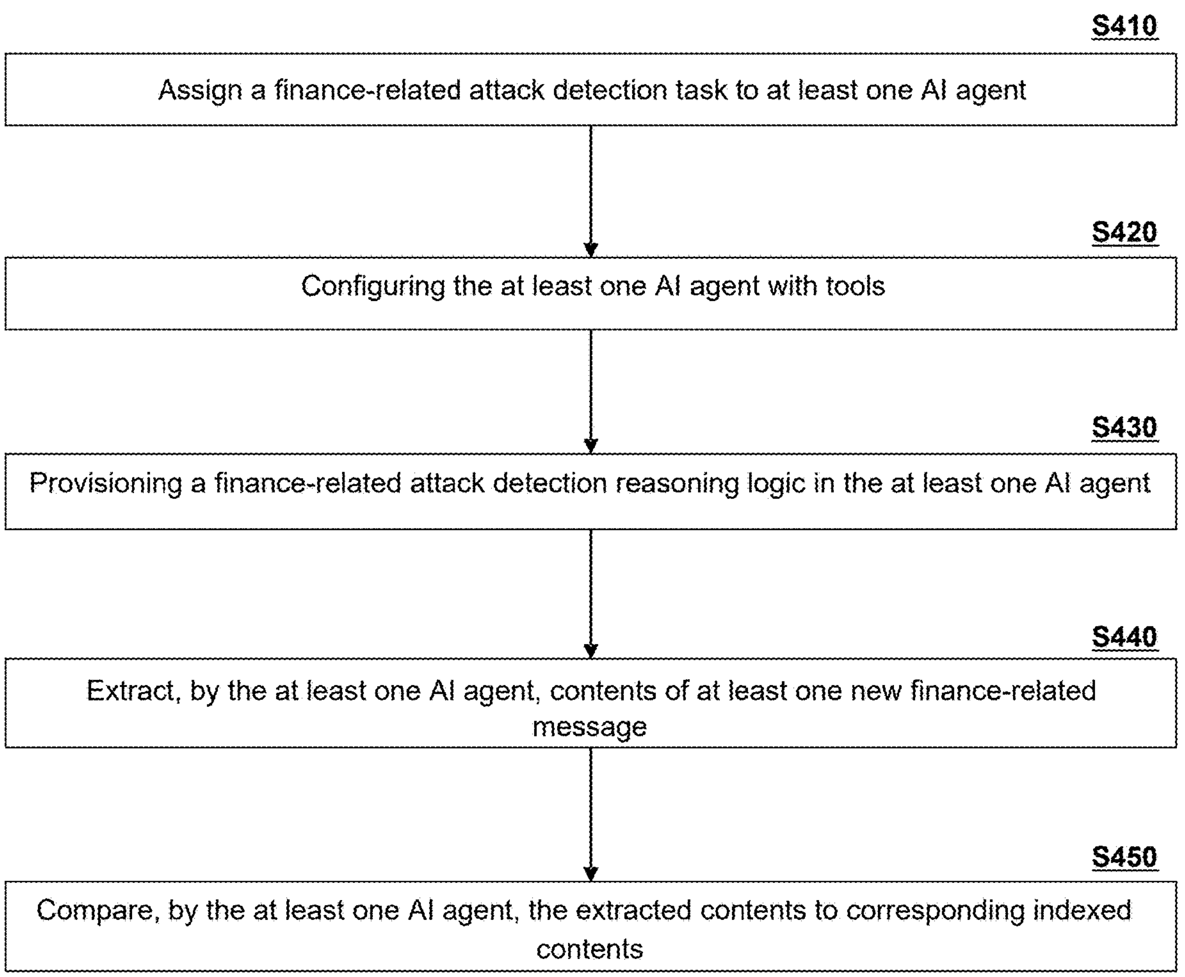
FIG. 4 shows an example flowchart illustrating a process for performing in-depth analysis, using an AI agent, to detect finance-related malicious activity according to an embodiment.

FIG. 4 shows an example flowchart S350 illustrating a process for performing in-depth analysis, using an AI agent, to detect finance-related malicious activity according to an embodiment. In some embodiments, the process is performed by specialized agent 220, FIG. 2.

At S410, a finance-related attack detection task is assigned. In some embodiments, a finance-related attack detection task is assigned to each AI agent. Each assigned finance-related attack detection task is related to detecting a type of finance-related malicious activity. It should be noted that assigned each AI agent a task to detect a specific type of finance-related malicious activity (e.g., attack) enables more efficient processing by each AI agent as opposed to using a generic AI agent configured to detect many types of finance-related malicious activities. As explained in further detail above, a type of finance-related malicious activity is based on characteristics of the finance-related malicious activity.

At S420, each AI agent is configured with tools. In some embodiments, tools are configured for each AI agent to achieve the assigned finance-related attack detection task. Tools are external services that the AI agent can invoke to accomplish the assigned specialized task. An example of a tool that is configured for an AI agent may be an indexed store of data about a tenant organization's messages (e.g., from the learning process S320, FIG. 3), external reputation services, a combination thereof, and the like.

At S430, a finance-related attack detection reasoning logic is provisioned. In some embodiments, a finance-related attack detection reasoning logic is provisioned for each AI agent. The finance-related attack detection reasoning logic relates to each assigned finance-related attack detection task. Additionally, the reasoning logic provides each AI agent an ability to select certain tools to invoke to accomplish the task assigned.

At S440, contents of the new message are extracted. In some embodiments, the contents of the new message that is determined as finance-related at S520 are extracted. In some embodiments, extracting the contents of the new message classified as finance-related further includes utilizing the AI agent (discussed above at S410, S420, and S430). In some embodiments, the AI agent includes a multi-modal generative artificial intelligence (genAI) model to extract contents (including images, videos, etc.) of the new message. In some embodiments, the contents are extracted using an LLM, a genAI model, a combination thereof, and the like.

In some embodiments, types of content that are extracted from the new message are the same as or similar to the types of content that are extracted from messages during the learning process (S320, FIG. 3), where extracting various types of content such as, but not limited to, financial indicators and legitimate communication patterns (such as, but not limited to, signatures, styles of communication, and geolocation metadata) serves to establish a baseline of legitimate communication in messages in the tenant organization. Establishing such a precise baseline allows the detection of cyberattacks where a threat actor uses a compromised vendor account to send a legitimate-seeming message.

In some embodiments, finance-related messages include structured and unstructured data. Various content types can be extracted, including but not limited to, the unstructured text in the email body or attachments, such as personal identifiers (e.g., Employee ID numbers, IBAN codes), company names, and physical addresses; document types, such as invoices, contracts, or pay stubs; structured metadata in email headers, including sender and recipient addresses, subject lines, and timestamps; content from attachments like PDFs, such as tabular data, scanned forms, or embedded identifiers; domain or originating store key, such as a financial website or company domain; and financial terms, transaction records, account numbers, and regulatory disclosures, which may appear in narrative form or embedded tables.

At S450, extracted contents are compared to corresponding indexed contents. In some embodiments, comparing extracted contents to corresponding indexed contents is performed using the AI agent (discussed above at S410, S420, and S430). In some embodiments, the AI agent is configured to perform the comparison of extracted contents to corresponding indexed contents according to the finance-related attack detection reasoning logic, tools, and assigned task. Corresponding indexed contents refers to indexed content that corresponds but is not necessarily identical to the extracted contents. For example, an indexed content may include a signature block of a finance-related email from a particular accounts payable department using a name and a particular job title (e.g., "Payment Coordinator") but the extracted content may include a corresponding signature block from a finance-related email from that same accounts payable department using the same (or different) name and a different job title (e.g., "Billing Manager").

In some embodiments, indexed content that corresponds to the extracted content is received. In some embodiments, this indexed content is received from a data store of content indexed during a learning process (e.g., at S320, FIG. 3). Indexed content includes, but is not limited to, a store key, identifier keys, sources, and timestamps.

A store key refers to a unique identifier corresponding to a specific financial website or domain from which the data originated or is associated. This allows for efficient grouping and retrieval of records tied to particular platforms or institutions. The identifier key designates the category or type of sensitive or structured data found within the email or its attachments, such as addresses, company names, document types, or personal identifiers like employee numbers or IBAN codes. This key helps define the semantic meaning of the extracted value. For example, if the identifier_key is "address," the associated value might be "123 Main St. Warsaw, Poland," clarifying the nature of the information stored. The source indicates the location within the email system where the identifier was found, such as the body of the email, the list of recipients, or attached PDFs. This provides crucial provenance metadata, aiding traceability and validation of the extracted content. Timestamps capture the temporal aspect of when the email or attachment was sent or received, enabling chronological analysis and correlation across messages.

In some embodiments, when a result of the comparison indicates that there is a sufficient deviation of the extracted contents from the corresponding indexed contents, it is determined that finance-related malicious activity exists in the content of the message.

Although FIG. 4 shows example blocks of process S350, in some implementations, process S350 may include additional blocks, fewer blocks, different blocks, or differently arranged blocks than those depicted in FIG. 4. Additionally, or alternatively, two or more of the blocks of process S350 may be performed in parallel.

Figure 5:
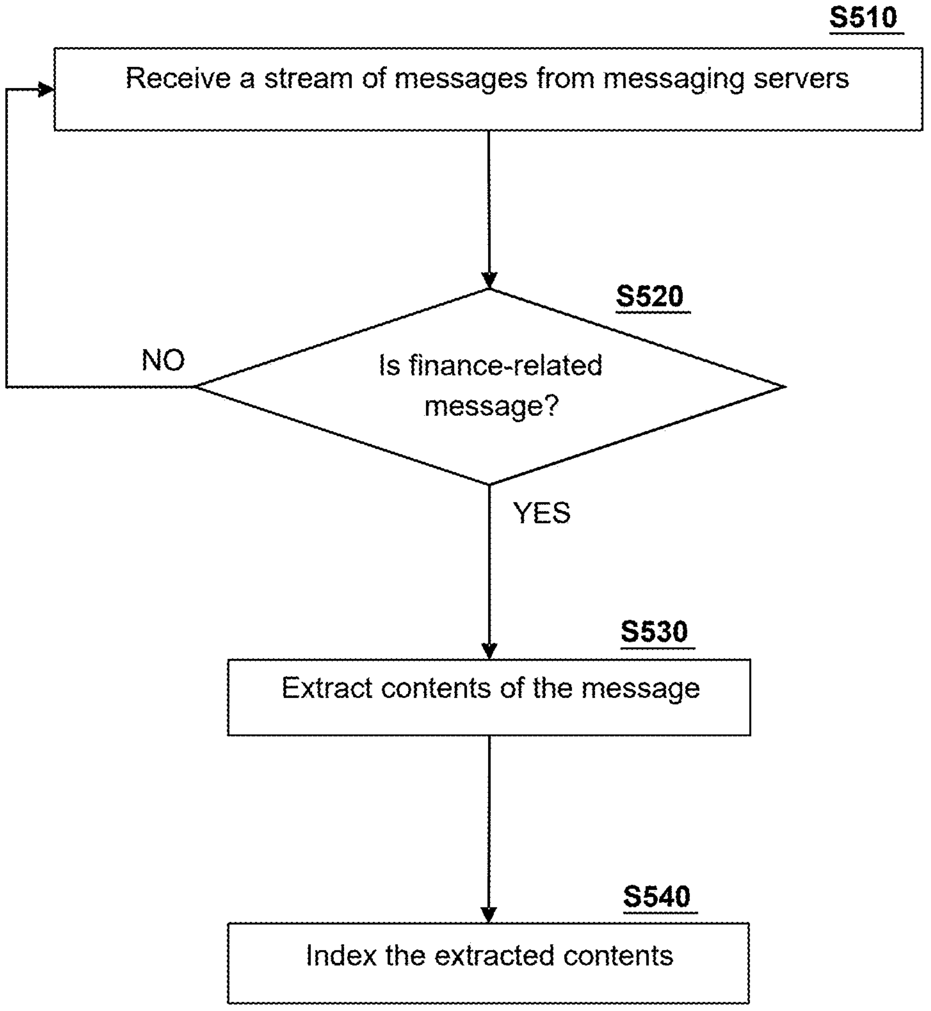
FIG. 5 shows an example flowchart illustrating a learning process according to an embodiment.

FIG. 5 shows an example flowchart S320 illustrating a learning process according to an embodiment. In some embodiments, the process is performed by AI-based detection system 130.

At S510, a stream of messages is received from one or more message servers. Message servers include, but are not limited to, servers in a cloud computing environment or platform (e.g., servers 140 in cloud computing environment 160, FIG. 1). Message servers are configured to store messages such as emails, SMS, and the like (examples of which are discussed above). In some embodiments, as explained above, receiving a stream of messages includes grouping messages into categories which may serve as labeled channels for communication.

At S520, it is determined whether a message is a finance-related message. In some embodiments, determining whether a message is a finance-related message includes classifying the message as finance-related or not finance-related based on the contents of the message and contextual information about the tenant organization from which the message is received.

At S530, contents of the message are extracted. In some embodiments, the contents of the message that is determined as finance-related at S520 are extracted. Extracting contents of the message involves extracting high-quality data points from unstructured traffic such as, but not limited to, invoice attachments and other document attachments. In some embodiments, extracting the contents of the message is performed by, but not limited to, an LLM, a multi-modal generative artificial intelligence (genAI) model to extract contents (including images, videos, named entities, etc.) of the message, a combination thereof, and the like. Extracting contents of the message includes extracting financial indicators and legitimate communication patterns including, but not limited to, signatures, styles of communication, and geolocation metadata. This precise extraction serves to establish a baseline of legitimate communication in messages in the tenant organization, allowing the detection of cyberattacks where a threat actor uses a compromised vendor account to send a legitimate-seeming message.

In some embodiments, various content types can be extracted, including but not limited to, the unstructured text in the email body or attachments, such as personal identifiers (e.g., Employee ID numbers, IBAN codes), company names, and physical addresses; document types, such as invoices, contracts, or pay stubs; structured metadata in email headers, including sender and recipient addresses, subject lines, and timestamps; content from attachments like PDFs, such as tabular data, scanned forms, or embedded identifiers; domain or originating store key, such as a financial website or company domain; and financial terms, transaction records, account numbers, and regulatory disclosures, which may appear in narrative form or embedded tables.

At S540, the extracted contents are indexed. Indexed contents are stored in a data store. Indexing content includes, but is not limited to, labeling the extracted data with labels such as a store key, identifier keys, sources, timestamps, a combination thereof, and the like, each of which is discussed in more detail herein.

Indexing the extracted contents in a data store provides an efficient source for the retrieval of key contents during the in-depth analysis of a new message based on a comparison of the extracted contents of the new message from the message servers of a tenant organization and the indexed contents of historical messages in a tenant organization.

Although FIG. 5 shows example blocks of process S320, in some implementations, process S320 may include additional blocks, fewer blocks, different blocks, or differently arranged blocks than those depicted in FIG. 5. Additionally, or alternatively, two or more of the blocks of process S320 may be performed in parallel.

Figure 6A:
FIG. 6A is an example email message containing malicious content according to an embodiment.

FIG. 6A is an example email message 600A containing malicious content according to an embodiment. In some embodiments, the content displayed in example email message 600A is configured to be classified (e.g., by classification module 210, FIG. 2) as finance-related or not finance-related. Example email message 600A contains content, including an email header 610, a portable document format (PDF) attachment 620 (hereinafter attachment 620), and an email body 630.

Email header 610 includes a FROM line, a TO line, a DATE line, and a SUBJECT line. The FROM line contains an email address from a financial institution called "youBank," showing an email domain of "youbank-security-.com," which differs from the email domain "youbank.com"

listed at the bottom of the email body 630. Additionally, SUBJECT line of email header 610 includes an urgent message requiring immediate user action related to an alleged login attempt to the user's bank account. Email body 630 contains a request for the recipient to "scan the QR code" in the attachment 620 on the recipient's mobile device in order to verify the activity. Based on the details in the contents, the message may be classified as finance-related.

As the message is classified as finance-related, the message is routed for in-depth analysis by the agent to determine if the message contains an indication of a malicious intent to perform a finance-related phishing attack. Despite example email message 600A appearing somewhat legitimate, based on the discrepancies in email domains, the urgent message in the SUBJECT line, and the QR code (discussed in more detail at FIG. 6B), in some embodiments, the contents of example email message 600A may be determined, by the AI agent, as malicious.

Figure 6B:
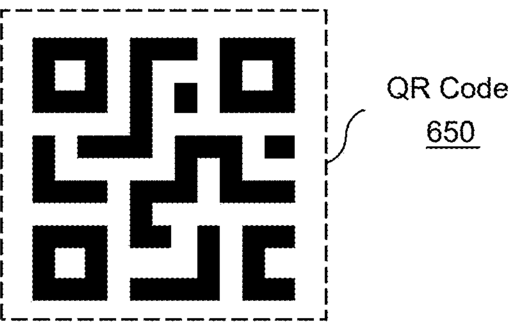
FIG. 6B is an example of content of the message that contains a malicious QR code according to an embodiment.
Figure 6B:

FIG. 6B is an example 600B of content of the message that contains a malicious QR code according to an embodiment.

The contents 640, including QR code 650, of attachment 620, FIG. 6A are secondary contents of the example email message 600A, FIG. 6A. Contents 640, including QR code 650, are extracted by the AI agent for in-depth analysis.

In some embodiments, in-depth analysis involves the AI agent scanning (e.g., processing text and image using a multi-modal genAI model) the target content (e.g., web domain and the like) of the QR code 650. When, for example, QR 650 redirects to a URL such as "http://youbank.recover-auth.io", that includes a web domain that is not the official domain ("youbank.com") of the bank but instead spoofs the bank's domain. It may be determined from the in-depth analysis that, based on the URL of the QR code, the contents 640 are malicious.

In some embodiments, the AI agent is configured with a specialized task to determine a particular finance-related malicious activity. Based on the above example email message 600A, FIG. 6A and the contents 640 (including QR code 650), the AI agent is configured to detect a mobile-targeted QR-based phishing attempt to steal user banking credentials. In some embodiments, there may be a plurality (e.g., a network) of AI agents, where each AI agent is configured to determine a particular type or aspect of a finance-related phishing attack (e.g., mobile-targeted, financial fraud, credential theft, QR phishing, etc.) and the plurality of AI agents are configured to communicate and coordinate with each other to perform the in-depth analysis.

Figure 7:
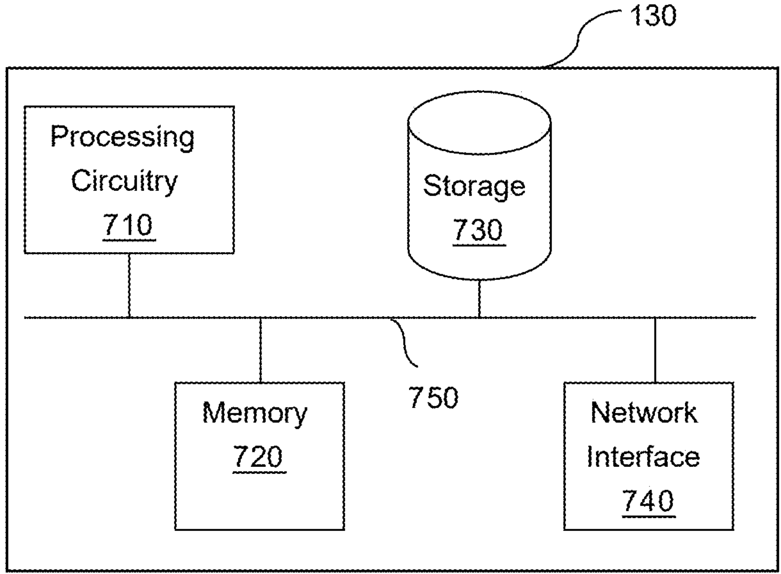
FIG. 7 is an example block diagram of a hardware architecture of a compute device.

FIG. 7 is an example block diagram of a hardware architecture of a compute device 700. In an embodiment, the AI-based detection system 130 can be realized using the hardware architecture of compute device 700.

The hardware architecture of compute device 700 includes a processing circuitry 710 coupled to a memory 720, a storage 730, and a network interface 740. In an embodiment, the components may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), graphics processing units (GPUs), system-on-a-chip systems (SOCs), general-purpose microprocessors, microcontrollers, digital signal processors (DSPs), and the like, or any other hardware logic components that can perform calculations or other manipulations of information.

In at least some embodiments, the processing circuitry 710 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 710 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In accordance with various such embodiments, the hardware utilized for the processing circuitry 710 is selected in order to enable genAI functionality based on factors such as, but not limited to, parallelism (e.g., amounts of parallel processing to be performed), memory demands (e.g., amounts of random access memory [RAM] utilized to store model weights and training during processing or video RAM [VRAM] to support large language models), clock speeds, thread counts, storage (for example, to support certain amounts of storage or storage speeds), cooling (e.g., liquid cooling or air cooling systems), power supply (e.g., in order to enable a target wattage used for certain kinds of activities), networking and connectivity (e.g., in order to support seamless data transfer for deployments involving communications between or among multiple machines or clusters), combinations thereof, and the like.

In embodiments which utilize large language models (LLMs) or otherwise perform operations which may require or be enhanced through use of parallel processing, the processing circuitry 710 may include one or more GPUs or other processing units suitable for parallel processing. Such GPUs may be configured to perform matrix multiplication operations including, but not limited to, performing dot product operations in order to support neural network operations (for example, by performing dot product operations for hidden layer computations) or performing dot product operations in an attention mechanism in order to compute a similarity score between vectors during attention weight computation. In at least some such embodiments using GPUs, the processing circuitry 710 may include a number of CPU cores which is equal to or greater than the number of GPUs in order to facilitate or otherwise support parallel processing via multiple GPUs.

The memory 720 may be volatile (e.g., RAM, etc.), non-volatile (e.g., ROM, flash memory, etc.), or any combination thereof. In one configuration, computer-readable instructions needed to implement one or more embodiments disclosed herein may be stored in the storage 730.

In another embodiment, the memory 720 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 710 to perform the various processes described herein.

The storage 730 may be magnetic storage, optical storage, and the like, and may be realized, for example, as flash memory or other memory technology, CD-ROM, Digital Versatile Disks (DVDs), hard drives, SSD, or any other medium which can be used to store the desired information, such as log of transactions, public keys, and so on. The storage 730 may include the various access policies and games.

The network interface 740 allows the client 120 to communicate with the Internet or a local area network. The network interface 740 communication with these elements.

It should be understood that the embodiments described herein are not limited to the specific architecture illustrated in FIG. 7 and that other architectures may be equally used without departing from the scope of the disclosed embodiments.

It should be further noted that AI-based detection system 130 may be realized using a computing architecture similar to the architecture illustrated in FIG. 7, but that other architectures may be equally used without departing from the scope of the disclosed embodiments. Further, the memory 720 may include instructions for executing the function of the respective device.

The various embodiments disclosed herein can be implemented as any combination of hardware, firmware, and software. Moreover, the software is preferably implemented as an application program tangibly embodied on a program storage unit or computer-readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the groups consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for defending against finance-related phishing attacks, comprising:

detecting when a message is a finance-related message based on contents of the message, wherein a finance-related message is a message that references at least identifiable financial elements;

for each finance-related message, identifying a type of finance-related malicious activity, wherein a type of finance-related malicious activity is based on characteristics of the finance-related message;

performing, using at least one AI agent from a network of AI agents, in-depth analysis of the contents of the message, wherein the at least one AI agent is specialized to detect the finance-related malicious activity of the identified type, and wherein the performing further includes:

assigning a finance-related attack detection task to each AI agent of the at least one AI agent, wherein each assigned specialized task relates to detecting a type of finance-related malicious activity;

configuring each AI agent with tools to achieve the assigned finance-related attack detection task, wherein tools are external services that the AI agent can invoke to accomplish the assigned specialized task; and provisioning a finance-related attack detection reasoning logic in each AI agent, wherein the finance-related attack detection reasoning logic relates to each assigned finance-related attack detection task and invocation of the tools to accomplish the finance-related attack detection task; and when a finance-related malicious activity is detected in the message as a result of performing the in-depth analysis, causing execution of a mitigation action.

2. The method of claim 1, further comprising:

when a finance-related malicious activity is not detected as a result of performing the in-depth analysis, releasing the message to an intended recipient client device.

3. The method of claim 1, further comprising:

receiving a stream of messages from a plurality of message servers; and performing a learning process based on contents of messages in the stream of messages.

4. The method of claim 3, wherein performing the learning process based on the contents of the messages in the stream of messages, further comprises:

using at least one classifier model, classifying the messages in stream of messages from at least one tenant organization as finance-related based on the contents of the messages;

extracting the contents of the messages classified as finance-related, wherein the contents include at least named entities and other relevant information; and indexing the extracted contents of the messages, wherein the indexed contents include contextual information on patterns in the contents of the messages for the at least one tenant organization;

cross-referencing the indexed contents to identify at least frequency, correlation, and consistency of the patterns in the contents of the messages for the at least one tenant organization; and aggregating the cross-referenced contents into a baseline representing at least legitimate communication and financial indicators unique to the tenant organization.

5. The method of claim 1, wherein performing, using the at least one AI agent from the network of AI agents, in-depth analysis of the contents of the message, further comprises:

extracting, by the at least one AI agent, the contents of the message; and comparing, by the at least one AI agent, the extracted contents of the message to corresponding indexed contents, wherein the corresponding indexed contents include contextual information on patterns in contents of messages for at least one tenant organization.

6. The method of claim 5, wherein a finance-related malicious activity is detected when the extracted contents of the message deviate from the corresponding indexed contents.

7. The method of claim 5, wherein extracting, by the at least one AI agent, the contents of the message, further comprises:

utilizing at least one multi-modal generative artificial intelligence (genAI) model to extract the contents of the message.

8. The method of claim 1, wherein the at least one AI agent includes a multi-modal generative artificial intelligence (genAI) model.

9. The method of claim 1, wherein the network of AI agents includes a plurality of AI agents, each AI agent of the plurality of AI agents configured to communicate and coordinate with other AI agents in the network of AI agents.

10. The method of claim 1, wherein detecting when the message is a finance-related message based on the contents of the messages further comprises:

using at least one classifier model, classifying the message as finance-related based on the contents of the message.

11. A non-transitory computer-readable medium storing a set of instructions for defending against finance-related phishing attacks, the set of instructions comprising:

one or more instructions that, when executed by one or more processing circuitry of a device, cause the device to:

detect when a message is a finance-related message based on contents of the message, wherein a finance-related message is a message that references at least identifiable financial elements;

for each finance-related message, identify a type of finance-related malicious activity, wherein a type of finance-related malicious activity is based on characteristics of the finance-related message;

perform, using at least one AI agent from a network of AI agents, in-depth analysis of the contents of the message, wherein the at least one AI agent is specialized to detect the finance-related malicious activity of the identified type, and wherein performing further includes:

assign a finance-related attack detection task to each AI agent of the at least one AI agent, wherein each assigned specialized task relates to detecting a type of finance-related malicious activity;

configure each AI agent with tools to achieve the assigned finance-related attack detection task, wherein tools are external services that the AI agent can invoke to accomplish the assigned specialized task; and provision a finance-related attack detection reasoning logic in each AI agent, wherein the finance-related attack detection reasoning logic relates to each assigned finance-related attack detection task and invocation of the tools to accomplish the finance-related attack detection task; and when a finance-related malicious activity is detected in the message as a result of perform the in-depth analysis, causing execution of a mitigation action.

12. A system for defending against finance-related phishing attacks comprising:

a processing circuitry;

a memory, the memory containing instructions that, when executed by the processing circuitry, configure the system to:

detect when a message is a finance-related message based on contents of the message, wherein a finance-related message is a message that references at least identifiable financial elements;

for each finance-related message, identify a type of finance-related malicious activity, wherein a type of finance-related malicious activity is based on characteristics of the finance-related message;

perform, using at least one AI agent from a network of AI agents, in-depth analysis of the contents of the message, wherein the at least one AI agent is specialized to detect the finance-related malicious activity of the identified type, and wherein performing further includes:

assign a finance-related attack detection task to each AI agent of the at least one AI agent, wherein each assigned specialized task relates to detecting a type of finance-related malicious activity;

configure each AI agent with tools to achieve the assigned finance-related attack detection task, wherein tools are external services that the AI agent can invoke to accomplish the assigned specialized task; and provision a finance-related attack detection reasoning logic in each AI agent, wherein the finance-related attack detection reasoning logic relates to each assigned finance-related attack detection task and invocation of the tools to accomplish the finance-related attack detection task; and when a finance-related malicious activity is detected in the message as a result of perform the in-depth analysis, causing execution of a mitigation action.

13. The system of claim 12, wherein the memory contains further instructions which when executed by the processing circuitry further configure the system to:

when a finance-related malicious activity is not detected as a result of perform the in-depth analysis, releasing the message to an intended recipient client device.

14. The system of claim 12, wherein the memory contains further instructions which when executed by the processing circuitry further configure the system to:

receive a stream of messages from a plurality of message servers; and perform a learning process based on contents of messages in the stream of messages.

15. The system of claim 14, wherein the memory contains further instructions that, when executed by the processing circuitry for performing the learning process based on the contents of the messages in the stream of messages, further configure the system to:

use at least one classifier model, classifying the messages in stream of messages from at least one tenant organization as finance-related based on the contents of the messages;

extract the contents of the messages classified as finance-related, wherein the contents include at least named entities and other relevant information; and index the extracted contents of the messages, wherein the indexed contents include contextual information on patterns in the contents of the messages for the at least one tenant organization;

cross-reference the indexed contents to identify at least frequency, correlation, and consistency of the patterns in the contents of the messages for the at least one tenant organization; and aggregate the cross-referenced contents into a baseline representing at least legitimate communication and financial indicators unique to the tenant organization.

16. The system of claim 12, wherein the memory contains further instructions that, when executed by the processing circuitry for performing, using the at least one AI agent from the network of AI agents, in-depth analysis of the contents of the message, further configure the system to:

extract, by the at least one AI agent, the contents of the message; and compare, by the at least one AI agent, the extracted contents of the message to corresponding indexed contents, wherein the corresponding indexed contents include contextual information on patterns in contents of messages for at least one tenant organization.

17. The system of claim 16, wherein a finance-related malicious activity is detected when the extracted contents of the message deviate from the corresponding indexed contents.

18. The system of claim 16, wherein the memory contains further instructions that, when executed by the processing circuitry for extracting, by the at least one AI agent, the contents of the message, further configure the system to:

utilize at least one multi-modal generative artificial intelligence (genAI) model to extract the contents of the message.

19. The system of claim 12, wherein the at least one AI agent includes a multi-modal generative artificial intelligence (genAI) model.

20. The system of claim 12, wherein the network of AI agents includes a plurality of AI agents, each AI agent of the plurality of AI agents configured to communicate and coordinate with other AI agents in the network of AI agents.

21. The system of claim 12, wherein the memory contains further instructions that, when executed by the processing circuitry for detecting when the message is a finance-related message based on the contents of the messages, further configure the system to:

use at least one classifier model, classifying the message as finance-related based on the contents of the message.

* * * * *